Patented Oct. 18, 1938

2,133,274

UNITED STATES PATENT OFFICE 2,133,274

DYESTUFFS OF THE ANTHRAQUINONE SERIES

William Dettwyler, Milwaukee, Wis., assignor to E. I. du Pont de Nemours & Company, Wilmington, Del., a corporation of Delaware No Drawing. Application May 25, 1936, Serial No. 81,687

4 Claims. (Cl. 260—276)

This invention relates to the preparation of new dyestuffs of the anthraquinone series, and more particularly to the preparation of the condensation products of 3-amino-anthraquinone-2,1(N)-benzacridone with organic acid chlorides, and their halogenation products. The invention has for its object the preparation of new dyestuffs of the anthraquinone-acridone series which dye cotton in deeper and more desirable shades than are obtained from the unsubstituted compounds of this series, and which have good fastness properties.

I have found that 3-amino-anthraquinone-2,1(N)-benzacridone (obtainable by the amidation of a 3-halogen-anthraquinone-2,1(N)-benzacridone, as more particularly described in copending application Serial No. 28,141), may be condensed with organic acid chlorides to give dyestuffs which dye cotton in fast red shades. I have also found that by the introduction of halogen in these new substituted anthraquinone-acridone dyestuffs, colors are obtained which have increased tinctorial strength. The halogen may be introduced either before or after the condensation is effected.

The following examples are given to more fully illustrate the invention. The parts used are by weight.

Example 1

10 parts of 3-amino-anthraquinone-2,1(N)-benzacridone and 5 parts of benzoyl chloride are heated in 250 parts of orthodichlorobenzene at about 170° C. for a period of 2 to 3 hours, or until no free amino-anthraquinone-benzacridone remains. The reaction mass is cooled to room temperature and the 3-benzoyl-amino-anthraquinone-2,1(N)-benzacridone filtered off, washed with ortho-dichlorobenzene, then with alcohol, and dried. When dry it is a red powder soluble in concentrated sulfuric acid with a brown red color and soluble in hot organic solvents with a red color. It dyes cotton from a violet hydrosulfite vat in fast red shades.

I found that acylation of 3-amino-anthraquinone-2,1(N)-benzacridone in all cases gives dyestuffs which dye in red shades, varying from yellowish to brownish red, depending on the particular acid chloride used. It is found that in general the acid chlorides of low molecular weight tend to give deeper (bluer) shades of red, while those of high molecular weight give yellower shades. The following list of condensation products is given to illustrate the broad scope of applicant's invention, all of which dye cotton in varying shades of red:

| Acid chloride condensed with 3-amino-anthraquinone-2,1 N) benzacridone | Color in $H_2SO_4$ |
| --- | --- |
| 2-naphthoyl chloride | Red brown. |
| Furoyl chloride | Do. |
| Anthraquinone-2-carbonyl chloride | Brown. |
| Anthrathiazole-2-carbonyl chloride | Yellow brown. |
| Anthraquinone-2,1-benzacridone-para-carbonyl chloride | Red brown. |
| Terephthaloyl chloride | Do. |
| Oxalyl chloride | Do. |

Example 2

Prior to the isolation of the product of Example 1 from the ortho-dichlorobenzene solution, 50 parts of acetic acid and 20 parts of sodium acetate (anhydrous) may be added, and chlorine passed into the solution at 100° C. until one molecular quantity for each mole of 3-amino-anthraquinone-2,1(N)-benzacridone originally used has been absorbed. The resulting 4-chloro-3-benzoylamino-anthraquinone-2,1(N)-benzacridone may be isolated as in Example 1. It dyes cotton in stronger shades than the non-chlorinated product.

Example 3

10 parts of 3-benzoylamino-anthraquinone-2,1(N)-benzacridone as prepared in Example 1 are suspended in 50 parts of nitrobenzene. 5 parts of sodium acetate and 50 parts of acetic acid are added. The mass is heated to 100° and chlorine gas is passed into the solution until 3 moles of chlorine have been absorbed. The new trichloro - 3 - benzoylamino - anthraquinone - 2,1 (N)-benzacridone thus obtained is a dark red powder, soluble in concentrated sulfuric acid with a red brown color. It dyes cotton in strong red shades.

Example 4

10 parts of a dibrominated 3-amino-anthraquinone-2,1(N)-benzacridone obtainable by the bromination of 3-amino-anthraquinone-2,1(N)-benzacridone, as more particularly outlined in copending application Serial No. 28,141, are heated with 3 parts of benzoyl chloride in 100 parts of nitrobenzene for one hour at reflux temperature. The mass is cooled and the crystalline product is isolated by filtration, washed with nitrobenzene and then with alcohol and dried. It is a dark red powder soluble in hot organic solvent with a red color and in concentrated sulfuric acid with a reddish brown color. It dyes cotton from a violet vat in red shades.

When the dibromo-3-amino-anthraquinone-2,1(N)-benzacridone is replaced by a trichlorinated 3-amino-anthraquinone-2,1(N)-benzacridone, dyestuffs having similar properties to those obtained in Example 4 are obtained.

It is, of course, understood that other acid chlorides than those specifically mentioned above may be condensed with 3-amino-anthraquinone-2,1(N)-benzacridone to produce dyestuffs having similar properties. Di-acid chlorides, for example diphenyl dicarboxylic acid chlorides, etc., and the long chain fatty acid chlorides, may be employed.

As illustrated above the halogenated derivatives can be prepared by direct halogenation of the condensation product or by using as the starting material a halogen containing 3-amino-anthraquinone-2,1(N)-benzacridone. The halogenation of the condensation product may be carried out in sulfuric acid, organic solvents, hydrochloric acid, or aqueous suspension. The addition of halogen to the molecule, irrespective of the constitution of the acidylamino group, imparts to the dyestuff increased tinctorial strength.

I claim:

1. Compounds of the class consisting of those of the following general formula and their halogenation products

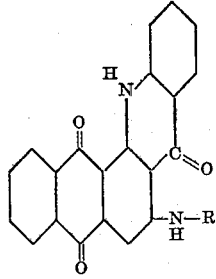

wherein R stands for an acyl radical of an organic carboxylic acid.

2. Compounds of the following general formula

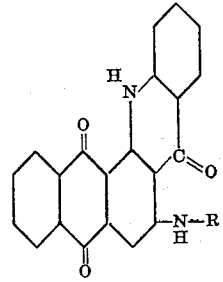

wherein R stands for an acyl radical of an organic carboxylic acid.

3. Compounds of the following general formula

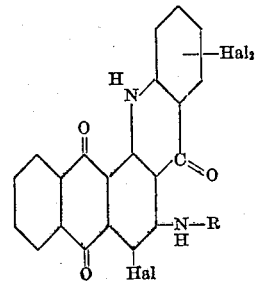

wherein R stands for an acyl radical of an organic carboxylic acid and Hal stands for halogen.

4. Compounds of the class consisting of those of the following general formula and their halogenation products

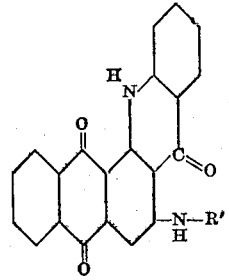

wherein R' stands for an acyl radical of an organic carboxylic acid of the benzene series.

WILLIAM DETTWYLER.